United States Patent [19]
Stratton

[11] Patent Number: 5,803,577
[45] Date of Patent: Sep. 8, 1998

[54] DECORATIVE LIGHTING DEVICE FOR VEHICLE

[76] Inventor: Andrew J. Stratton, 3294 NE. Crimson Pl., Hillsboro, Oreg. 97124

[21] Appl. No.: 764,684

[22] Filed: Dec. 3, 1996

[51] Int. Cl.$^6$ ................................. F21S 1/14; F21P 1/02
[52] U.S. Cl. ........................... 362/80; 362/398; 362/249; 362/223; 362/806
[58] Field of Search ...................... 40/592, 591; 362/398, 362/249, 250, 80, 83.3, 252, 223, 219

[56] References Cited

U.S. PATENT DOCUMENTS

| | | | |
|---|---|---|---|
| 3,305,961 | 2/1967 | Lanzon et al. | 40/591 |
| 3,970,837 | 7/1976 | Helm | 362/249 |
| 4,885,664 | 12/1989 | Hermanson | 362/249 |
| 5,016,145 | 5/1991 | Singleton | 362/80.1 |
| 5,057,981 | 10/1991 | Bowen et al. | 362/249 |
| 5,103,205 | 4/1992 | Halligan | 40/591 |
| 5,193,895 | 3/1993 | Naruke et al. | 362/83.3 |
| 5,367,806 | 11/1994 | Hoffman | 40/591 |

*Primary Examiner*—Thomas M. Sember

[57] ABSTRACT

A lighting device for mounting on a vehicles exterior door or other metal parts by means of magnetic strip. The lighting device includes a plastic coated light strip that is attached to magnets. The device includes a male power connector on one end for plugging to the vehicle's lighter socket and a female connector for multiple lighting devices to be mounted on the vehicle. Power cord holders installed along the dashboard will prevent the power cord from interfering with the vehicle's operation. The lighting device can be molded into any shape, design or words or can be left as straight strips.

3 Claims, 5 Drawing Sheets

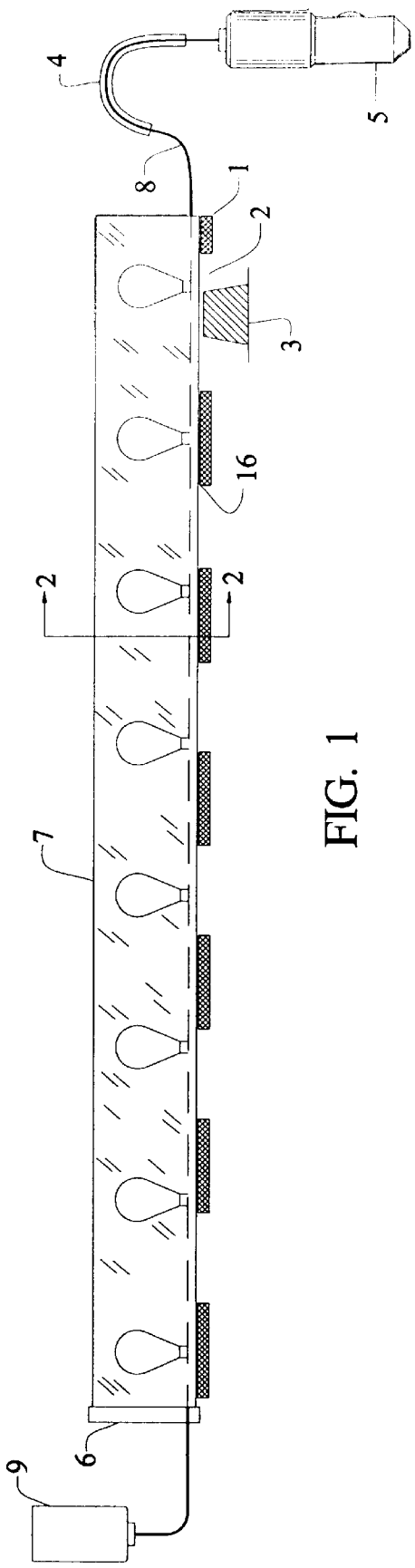
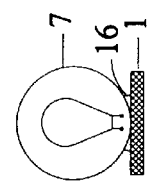
FIG. 1
FIG. 2 ical clips and suction cups. U.S. Pat. No. 5,311,417 which issued

DECORATIVE LIGHTING DEVICE FOR VEHICLE

BACKGROUND OF THE INVENTION

1. Field of the Invention

The present invention relates to an exterior illumination display as it pertains to an ornamental device to be used as a motor vehicle decoration for celebrating Christmas, other holiday's and special occasions such as weddings and anniversary's as well as signs for business and personal identification.

2. Description of the Prior Art

The U.S. Pat. No. 5,016,145 which issued to K. Singleton on May 14, 1991 discloses an ornamental display device for use celebrating Christmas and other holidays with means only for installing within a vehicle by the use of magnetic clips and suction cups. U.S. Pat. No. 5,311,417 which issued to M. Heh on May 10, 1994 describes a devices suitable for display from the interior window of a vehicle. U.S. Pat. No. 4,574,269 issued to G. Miller on Mar. 4, 1986, U.S. Pat. No. 4,264,979 which issued to K. Gutowski on Apr. 28, 1981, U.S. Pat. No. 4,114,299 issued to T. Brownlee on Sep. 19, 1978 and U.S. Pat. No. 4,112,376 issued to R. Fosnough; M. Nelson on Sep. 5, 1978 all disclose a communicator device mounted at the interior rear window of a vehicle. U.S. Pat. No. 5,461,548 which issued to J. Esslinger on Oct. 24, 1995 describes a device to be used as a sign for permanent exterior mounting on large vehicles using fiber optic cables to back light a pre-imaged sign panel. U.S. Pat. No. 4,157,531 which issued to H. Mount on Jun. 5, 1979 describes a device to be used as an emergency signal which is mounted by clips to the exterior of a window or the roof of the car by magnets. These and other prior art ornamental and sign devices require a great deal of time and expense to install or when mounting in a vehicle must be done so in front of a window thus limiting the drivers view. Additionally, devices mounted on or in side of a vehicle window operating in northern or cold climates could create a condition of extremely limited visibility when even slight condensation or fogging of the windows occurs.

SUMMARY OF THE INVENTION

The object of the present invention is to provide an illuminated device that can be permanently shaped and molded into desired designs, names or left in straight sections.

It is also another object of this invention to provide a display or sign device that when complete can be magnetically attached to the exterior of a vehicle for ease of installation and removal to prevent theft, eliminating the lengthy and costly installation time of prior art.

It is also another object of this invention to provide a display or sign device for use on the exterior of a vehicle that will be mounted on the metal portion of a vehicle to prevent the obstruction of the windows inherent in the prior art. It is also another object of this invention to provide an easy method of electrically connecting the device to the vehicles internal power source with a standard cigarette lighter plug.

It is also another object of this invention to provide a plastic coated lighting strip permanently attached to a magnetic strip with all weather adhesive at each end and adjustable mounting at various points between for matching the vehicles door molding design or if the seasonal design is complex in nature the display device will be predominately mounted to a magnetic sheet with an all weather adhesive.

The present invention will receive electrical power from a power cord attached to the lighting device that would extend through the window and connect to the vehicles cigarette lighter additionally the power cord will be equipped with an adjustable polyethylene protector to be placed in the window to protect the power cord from damage due to closing of the window.

It is also another object of this invention to provide plastic power cord holders to prevent the cord from becoming an obstruction to the vehicle operator as with prior art.

BRIEF DESCRIPTION OF THE DRAWINGS

The present invention will be more fully understood by reference to the following detailed description thereof when read in conjunction with the attached drawings, and wherein:

FIG. 1 is a sectional view of the present invention.

FIG. 2 is a cross sectional view of the embodiment of the present invention.

DETAILED DESCRIPTION

Figure 3:
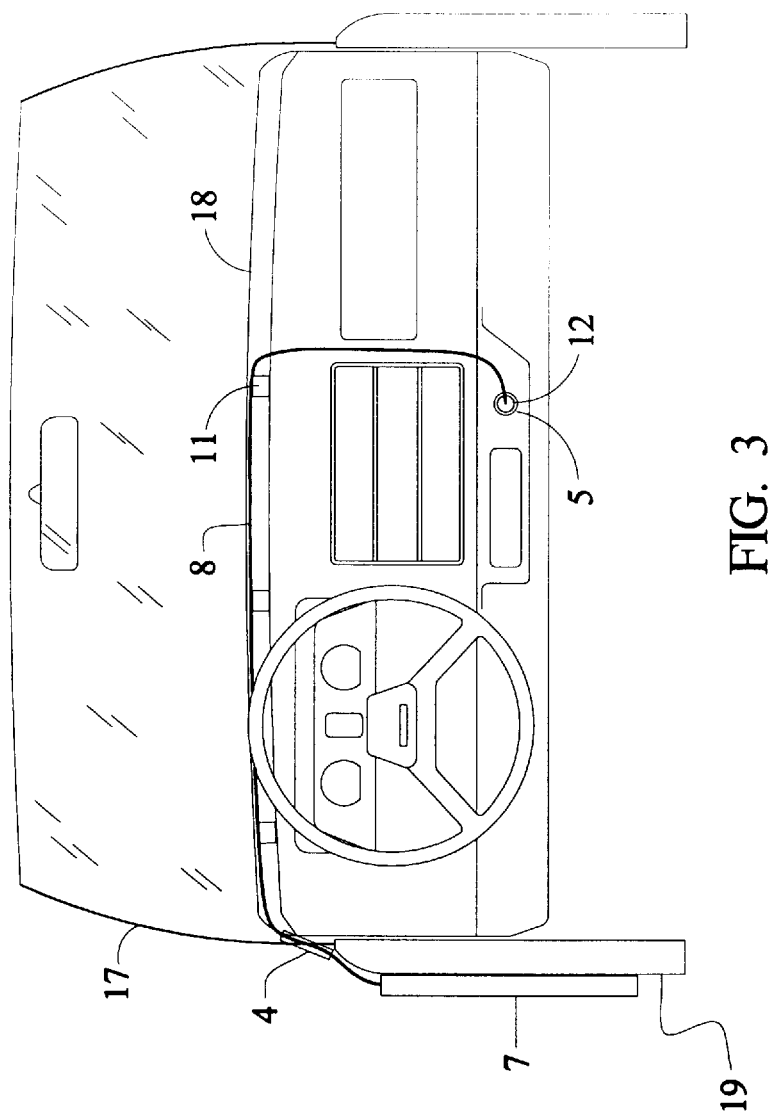
FIG. 3 is an illustration of the invention when installed on a vehicle.

As FIG. 1 shows the present invention comprises a sealed lighting strip 7, attached to a magnetic strip 1 with weather proof adhesive 16, with this magnetic strip being so placed 2 to allow for adjustment around vehicles decorative molding 3. The lighting strip 7 will receive it's electrical power from cord 8, being attached to a standard cigarette lighter plug 5. The power cord will have a protective adjustable piece 4. The lighting may include an end cap 6 for attaching a female electrical connector 9 so two or more lighting strings can be connected together.

As shown in FIG. 2 the magnetic strip is attached to a transparent sheathed lighting string with weather proof adhesive 16, this lighting string 7 may contain multi or single colored lights.

As shown in FIG. 3 the power cord will be extended from the lighting string 7 through the vehicles window 17 where it can be connected to the vehicles power supply 12, to protect the electrical power cord 8 an adjustable plastic sleeve 4 will be placed in the position where the window 17 will close, the power cord will be secured in place when run across the vehicles dashboard 18 by cord holder 11 mounted to the dashboard with double sided tape. The lighting string 7 will be magnetically secured to the vehicles door 19.

Figure 4:
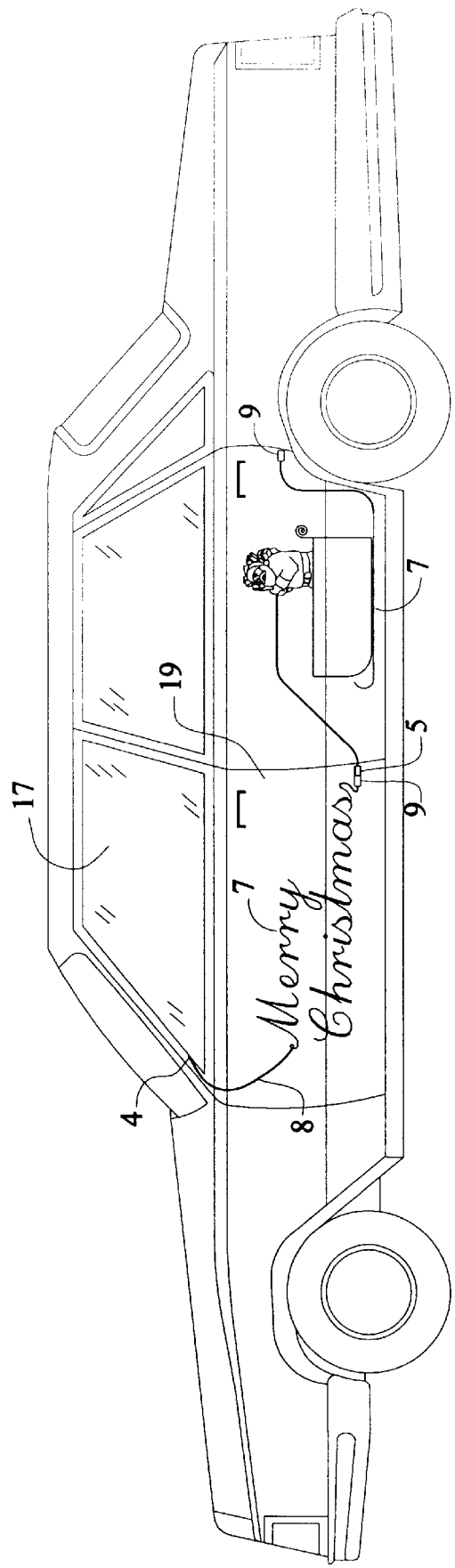
FIG. 4 is yet another illustration of the invention showing possible shapes and designs when installed on a vehicle.
Figure 5:
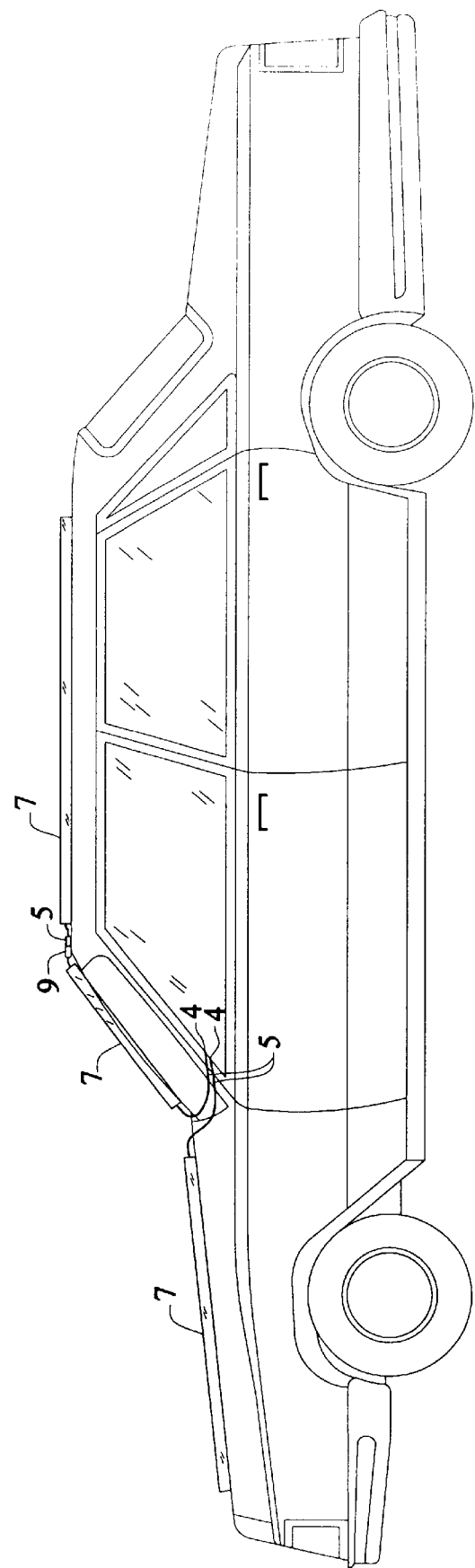
FIG. 5 is yet another illustration of the invention showing a straight section of lighting when installed on a vehicle.

FIGS. 4 and 5 shows the lighting string 7 in possible shapes mounted on the vehicles exterior. FIGS. 4 and 5 also shows the power connectors 5 and 9 connected to allow for mounting of additional lighting strings 7 if so desired.

Figure 7:
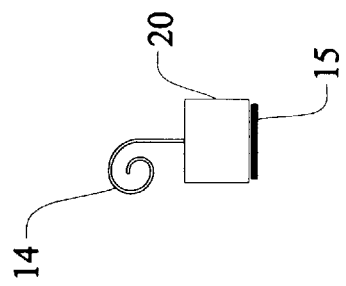
FIG. 7 is a detail of the device used for securing the power cord as illustrated in FIG. 6.
Figure 6:
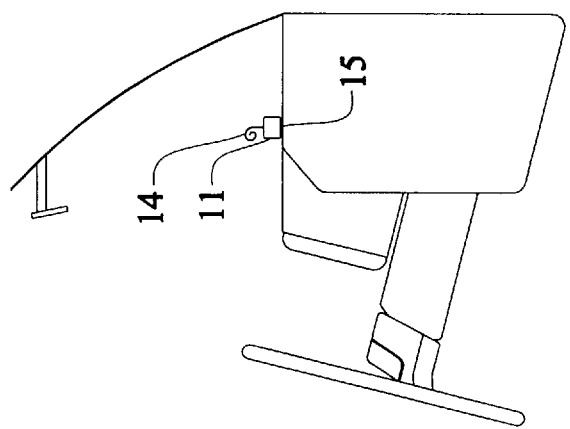
FIG. 6 is an illustration of the method used for securing the electrical cord from the invention.

FIG. 6 shows the cord holder device 11 mounted on the vehicles dashboard 18 by means of double sided tape 15. FIG. 7 shows the cord holder 11 which consists of the cord holder 14 and base 20. The cord holder assembly will be constructed of a single piece of molded plastic. The bottom of piece 20 will be flat to allow for good bonding of two sided tape 15.

I claim:

1. A decorative lighting device for attachment to metal exterior parts of a vehicle, comprising:
   a clear plastic coated lighting strip including 12 volt lights connected to a bulb base, and a wire located within said clear plastic coated lighting strip;
   a magnetic strip attached to said lighting strip along the length thereof;
   a power cord electrically connected to said wire;
   a male electrical connector adapted for electrically connecting to an existing power outlet in the vehicle for powering a cigarette lighter, wherein said male electrical connector is electrically connected to said power cord;
   a female electrical connector electrically connected to said power cord, wherein said female electrical connector is adapted to electrically couple to said male electrical connector, for electrically connecting together more than one of the decorative lighting device;
   a protector slidably disposed around said power cord for protecting said power cord from damage resulting from contact with a door or window of the vehicle; and
   a holder adapted for attachment to a dashboard of the vehicle and to retain a portion of said power cord to prevent said power cord from interfering with operation of the vehicle, wherein said holder is attached to said dashboard by a double sided adhesive tape.

2. The lighting device of claim 1, wherein said magnetic strip is magnetically attached to the metal exterior parts of the vehicle.

3. The lighting device of claim 1, wherein said lights of said clear plastic coated lighting strip are disposed to form a pattern consisting of at least one of a letter, a shape or a design.

* * * * *